(12) United States Patent
Wu

(10) Patent No.: US 9,709,709 B2
(45) Date of Patent: Jul. 18, 2017

(54) OPTICAL LAMPSHADE AND RELATED CAMERA DEVICE CAPABLE OF DECREASING NOISE OF OPTICAL REFLECTION

(71) Applicant: GeoVision Inc., Taipei (TW)

(72) Inventor: Chih-Ming Wu, New Taipei (TW)

(73) Assignee: GeoVision Inc., Taipei (TW)

( * ) Notice: Subject to any disclaimer, the term of this patent is extended or adjusted under 35 U.S.C. 154(b) by 396 days.

(21) Appl. No.: 14/537,908

(22) Filed: Nov. 11, 2014

(65) Prior Publication Data
US 2016/0134819 A1  May 12, 2016

(51) Int. Cl.
| | |
|---|---|
| H04N 5/225 | (2006.01) |
| G03B 15/03 | (2006.01) |
| G02B 5/00 | (2006.01) |
| G02B 27/00 | (2006.01) |
| G03B 15/05 | (2006.01) |
| G03B 17/08 | (2006.01) |
| G03B 11/04 | (2006.01) |

(52) U.S. Cl.
CPC ......... *G02B 5/003* (2013.01); *G02B 27/0006* (2013.01); *G03B 11/045* (2013.01); *G03B 15/05* (2013.01); *G03B 17/08* (2013.01); *H04N 5/2254* (2013.01); *G03B 2215/0542* (2013.01)

(58) Field of Classification Search
CPC .................................................... H04N 5/2254
USPC ........................................................... 348/373
See application file for complete search history.

(56) References Cited

U.S. PATENT DOCUMENTS

| | | | | |
|---|---|---|---|---|
| 7,651,281 B2 * | 1/2010 | Wen | ........................ | G03B 15/03 348/373 |
| 2010/0128446 A1 * | 5/2010 | DiPoala | ................. | G08B 17/00 361/729 |

* cited by examiner

*Primary Examiner* — Joel Fosselman
(74) *Attorney, Agent, or Firm* — Winston Hsu

(57) ABSTRACT

An optical lampshade is capable of decreasing noise of optical reflection includes a first transparent component, a second transparent component and an opaque component. An opening is formed on the first transparent component. An accommodating space is located inside the first transparent component. The first transparent component includes a first interior surface and a first exterior surface. The second transparent component is assembled with the first transparent component via the opening. The opaque component is disposed between the first transparent component and the second transparent component. The opaque component stretches from the first exterior surface to the first interior surface, and is suspended inside the accommodating space of the first transparent component.

15 Claims, 5 Drawing Sheets

OPTICAL LAMPSHADE AND RELATED CAMERA DEVICE CAPABLE OF DECREASING NOISE OF OPTICAL REFLECTION

BACKGROUND OF THE INVENTION

1. Field of the Invention

The present invention relates to an optical lampshade and a related camera device, and more particularly, to an optical lampshade and a related camera device capable of decreasing noise of optical reflection.

2. Description of the Prior Art

The camera apparatus includes an image detector and an infrared light source. The infrared light source is switched off when the image detector is actuated to capture a monitoring image in the daytime, and the infrared light source is switched on in the dark to provide night visual function for the image detector. The conventional camera apparatus utilizes an optical transparent shelter to cover the image detector and the infrared light source. A beam emitted by the light source can pass through the optical transparent shelter to project onto an object within the monitoring area, and the image detector can capture the beam reflected from the object to generate the corresponding image. However, the conventional optical transparent shelter is easily polluted because the camera apparatus is disposed in an outdoor environment, which results in internal reflection within a light transmissive layer of the conventional optical transparent shelter, and quality of the image captured by the image detector is obviously decreased. Another conventional camera apparatus includes an opaque board, which may be adhered to an inner surface of the conventional optical transparent shelter to be located between the image detector and the infrared light source. Although the opaque board can prevent the beam emitted by the infrared light source from being direct projected onto the image detector, the internal reflection cannot overcome by disposal of the opaque board.

SUMMARY OF THE INVENTION

The present invention provides an optical lampshade and a related camera device capable of decreasing noise of optical reflection for solving above drawbacks.

According to the claimed invention, an optical lampshade is capable of decreasing noise of optical reflection. The optical lampshade includes a first transparent component, a second transparent component and an opaque component. An opening is formed on the first transparent component. An accommodating space is located inside the first transparent component. The first transparent component includes a first interior surface and a first exterior surface. The second transparent component is assembled with the first transparent component via the opening. The opaque component is disposed between the first transparent component and the second transparent component. The opaque component stretches from the first exterior surface to the first interior surface, and is suspended inside the accommodating space of the first transparent component.

According to the claimed invention, the second transparent component is an individual unit and detachably disposed inside the opening on the first transparent component.

According to the claimed invention, the second transparent component includes a second interior surface and a second exterior surface. The opaque component stretches from the second exterior surface to the second interior surface since the opaque component is disposed between the first transparent component and the second transparent component.

According to the claimed invention, a height of the opaque component is greater than a thickness of the first transparent component or a thickness of the second transparent component.

According to the claimed invention, two edges of the opaque component respectively align with or protrude from the first interior surface and the first exterior surface.

According to the claimed invention, the opaque component is an enclosed structure disposed around the second transparent component and engaged inside the opening on the first transparent component.

According to the claimed invention, a camera device is capable of decreasing noise of optical reflection. The camera device includes a base, an image detector disposed on the base, alight source disposed around the image detector, and an optical lampshade disposed on the base to cover the image detector and the light source. The optical lampshade includes a first transparent component, a second transparent component and an opaque component. An opening is formed on the first transparent component. An accommodating space is located inside the first transparent component. The first transparent component includes a first interior surface and a first exterior surface. The second transparent component is assembled with the first transparent component via the opening. The opaque component is disposed between the first transparent component and the second transparent component. The opaque component stretches from the first exterior surface to the first interior surface, and is suspended inside the accommodating space of the first transparent component to isolate the image detector and the light source.

According to the claimed invention, a beam emitted by the light source passes through the first transparent component, and the image detector captures an image via the second transparent component.

According to the claimed invention, the opaque component surrounds the image detector and is extended inward into the accommodating space to isolate the image detector and the light source.

According to the claimed invention, the opaque component surrounds the light source and is extended inward into the accommodating space to isolate the image detector and the light source.

The opaque component includes at least two transparent components and at least one opaque component. The first transparent component and the second transparent component are respectively applied to the image detector and the light source for beam transmission, the opaque component is blocked between the sectional surfaces of the transparent components to isolate noise of the internal reflection. Two edges of the opaque component at least align with the exterior surface and the interior surface respectively, or preferably protrude from the exterior surface and the interior surface for high potency isolation. According to different embodiments, the opaque component may be the enclosed structure, which surrounds the image detector to prohibit the beam projected from the light source to the image detector or surrounds the light source to constrain light-emitting angle of the light source. The opaque component further may be mainly composed of the isolating baffles. Each isolating baffle is extended inward into the accommodating space to isolate the image detector and the light source. Comparing to the prior art, the opaque component is utilized to avoid the internal reflection between the transparent components respectively applied to the image detector and the light source, so the camera device with the opaque component can photograph the high-quality images without considering clean of the transparent component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
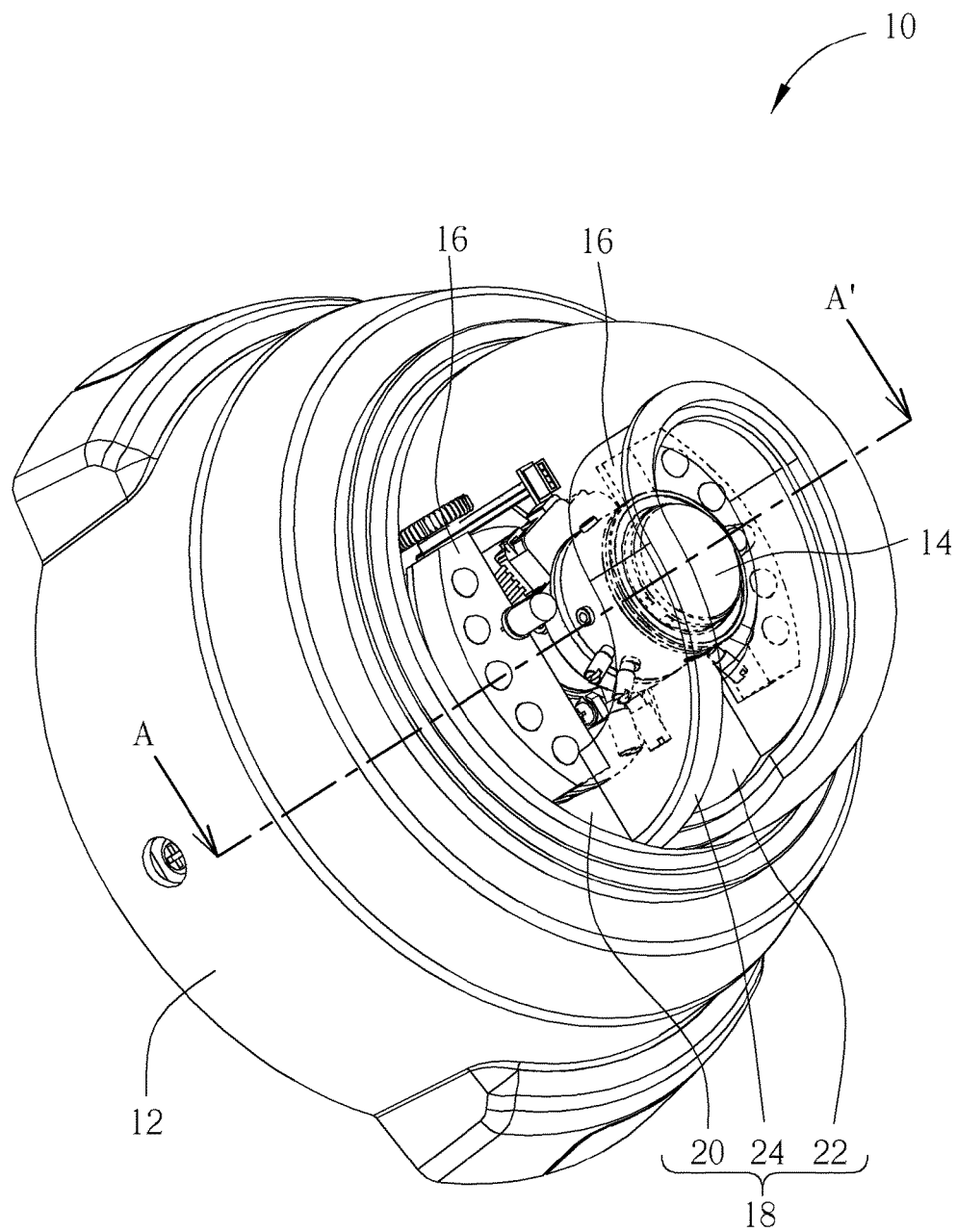
FIG. 1 is an assembly diagram of a camera device according to an embodiment of the present invention.
Figure 2:
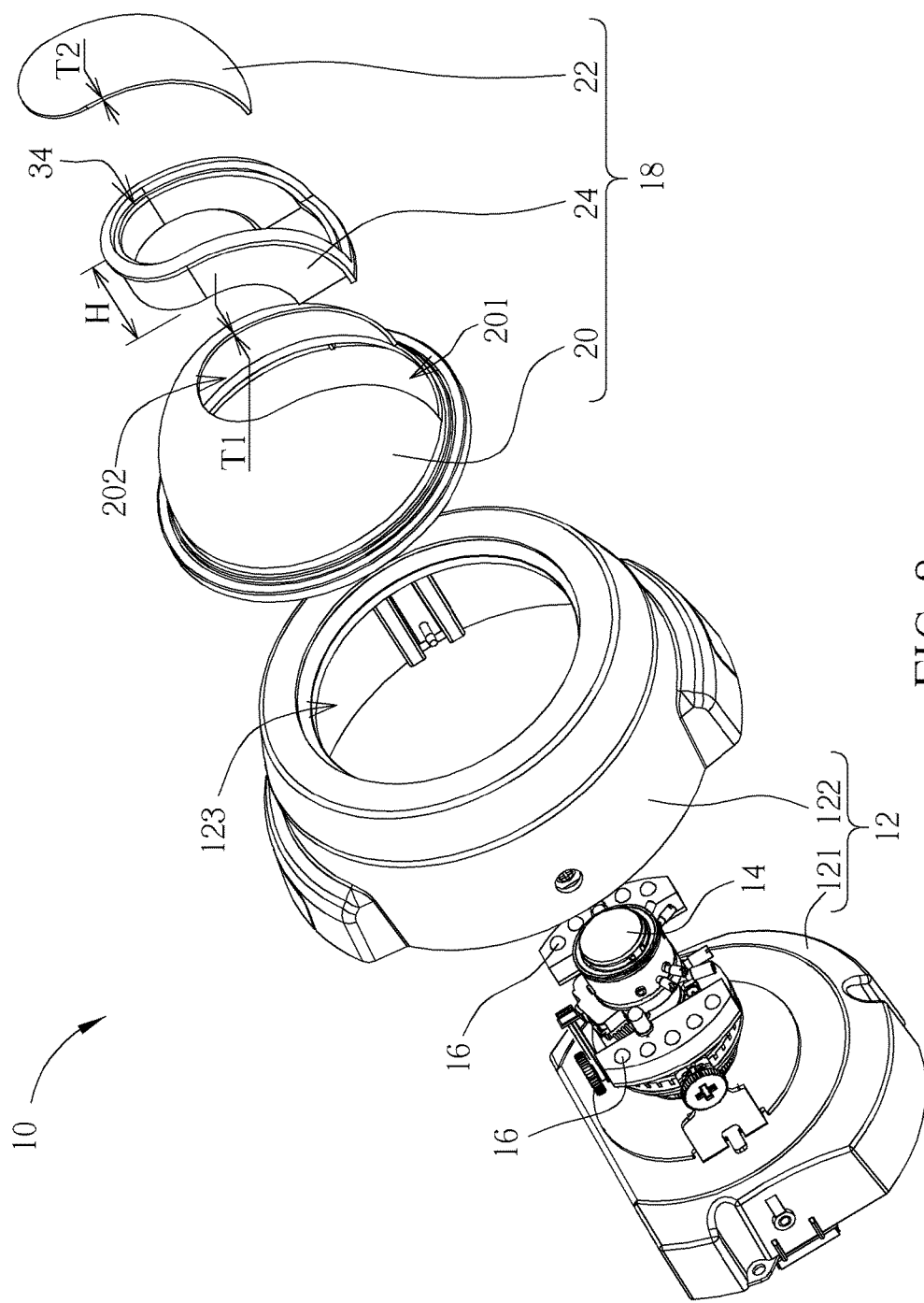
FIG. 2 is an exploded diagram of the camera device according to the embodiment of the present invention.

Please refer to FIG. 1 and FIG. 2. FIG. 1 is an assembly diagram of a camera device 10 according to an embodiment of the present invention. FIG. 2 is an exploded diagram of the camera device 10 according to the embodiment of the present invention. The camera device 10 includes a base 12, an image detector 14, a light source 16 and an optical lampshade 18. The base 12 can be mainly composed of a lower housing 121 and an upper housing 122. The image detector 14 is rotatably disposed on the lower housing 121, and the light source 16 is disposed around the image detector 14. The upper housing 122 has a hole 123 and is detachably disposed on the lower housing 121. The image detector 14 and the light source 16 protrude from the upper housing 122 via the hole 123 since the upper housing 122 and the lower housing 121 are assembled. The optical lampshade 18 is detachably disposed on the base 12 to cover the image detector 14 and the light source 16 for functions of waterproof and dustproof.

The optical lampshade 18 includes a first transparent component 20, a second transparent component 22 and an opaque component 24. An opening 201 is formed on the first transparent component 20, and a shape of the opening 201 corresponds to a rotary track of the image detector 14. The first transparent component 20 preferably can be an arched structure whereinside an accommodating space 202 is located. The image detector 14 and the light source 16 are situated on the accommodating space 202 since the optical lampshade 18 is disposed on the base 12. The second transparent component 22 is an individual unit detachably assembled with the first transparent component 20 via the opening 201. It is to say, the second transparent component 22 is not integrated with the first transparent component 20 monolithically. A beam emitted by the light source 16 passes through the first transparent component 20 and is projected onto an object within a monitoring area of the image detector 14. The image detector 14 can capture the beam reflected from the foresaid object and passing through the second transparent component 22 to generate an image about the object. The light source 16 may be an infrared light source to provide night visual function.

The opaque component 24 is disposed between the first transparent component 20 and the second transparent component 22. The opaque component 24 is utilized to cover sectional surfaces on the boundary between the first transparent component 20 and the second transparent component 22, which means an optical transmission path through the first transparent component 20 to the second transparent component 22 is blocked by the opaque component 24, so that the second transparent component 22 is isolated and not affected by internal reflection of the first transparent component 20 due to disposal of the optical lampshade 18. As the beam emitted by the light source 16 passes through the first transparent component 20, the foresaid beam cannot transmit to the second transparent component 22 and quality of the image captured by the image detector 14 has no effect upon the foresaid beam. The optical lampshade 18 and the camera device 10 having the optical lampshade 18 can be used to decrease, even completely eliminate, noise of optical reflection (the internal reflection) from the first transparent component 20 to the second transparent component 22.

Figure 3:
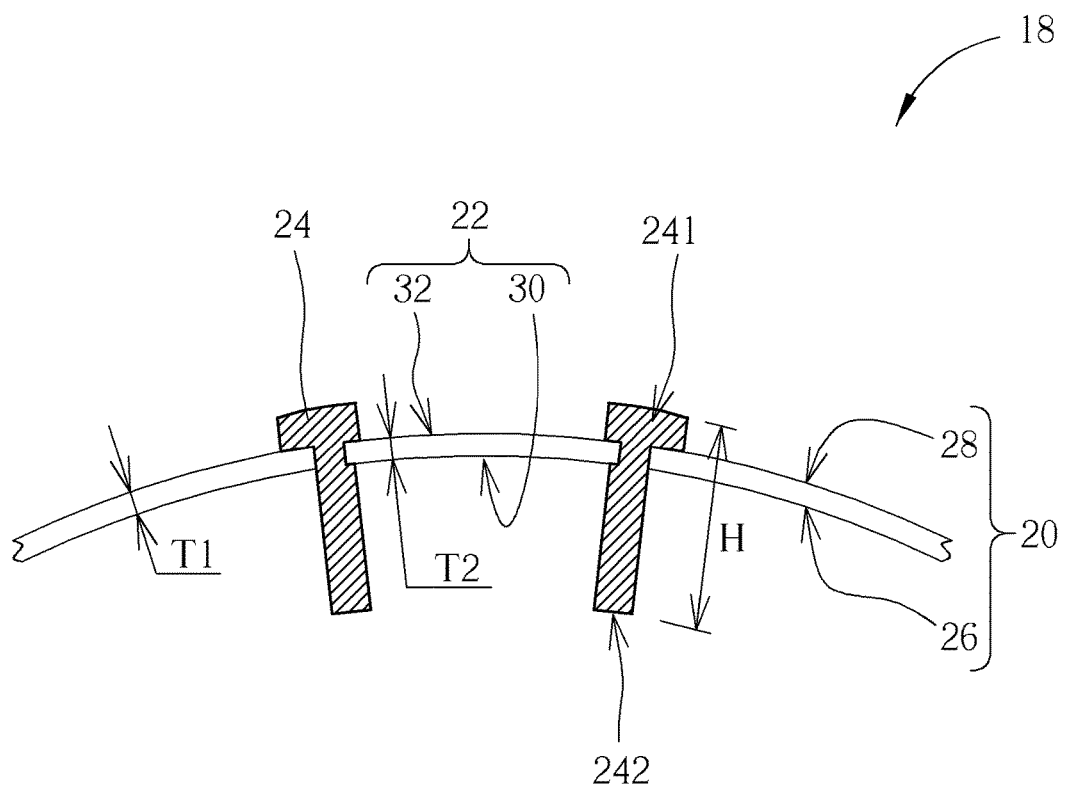
FIG. 3 is a sectional view of an optical lampshade in FIG. 1 along line A-A'.

Please refer to FIG. 2 and FIG. 3. FIG. 3 is a sectional view of the optical lampshade 18 in FIG. 1 along line A-A'. The first transparent component 20 includes a first interior surface 26 and a first exterior surface 28. As dust on the first exterior surface 28, the beam emitted by the light source 16 may generate the internal reflection between the first interior surface 26 and the first exterior surface 28, and the foresaid beam cannot transmit from the first transparent component 20 to the second transparent component 22 by obstruction of the opaque component 24. The second transparent component 22 includes a second interior surface 30 and a second exterior surface 32. A height H of the opaque component 24 is greater than a thickness T1 of the first transparent component 20 and/or a thickness T2 of the second transparent component 22. When the opaque component 24 is assembled with the first transparent component 20 and the second transparent component 22, an upper edge 241 of the opaque component 24 at least aligns with the first exterior surface 28, a lower edge 242 of the opaque component 24 is suspended inside the accommodating space 202 and located between the image detector 14 and the light source 16. The upper edge 241 and the lower edge 242 preferably protrude from the first exterior surface 28 and the first interior surface 26, and/or the second exterior surface 32 and the second interior surface 30.

In other words, the opaque component 24 at least stretches from the first exterior surface 28 to the first interior surface 26 because the upper edge 241 and the lower edge 242 align with or protrude from the first exterior surface 28 and the first interior surface 26. Further, the opaque component 24 stretches from the second exterior surface 32 to the second interior surface 30 because the second transparent component 22 is engaged with a sunken slot 34 of the opaque component 24. The beam emitted by the light source 16 may generate the internal reflection within the first transparent component 20 but cannot transmit to the second transparent component 22 due to disposal of the opaque component 24.

In this embodiment, the opaque component 24 can be an enclosed structure disposed around the second transparent component 22 and engaged inside the opening 201 on the first transparent component 20. The opaque component 24 further surrounds the image detector 14 and is extended inward into the accommodating space 202 to isolate the image detector 14 and the light source 16, so the beam emitted by the light source 16 does not directly project onto the image detector 14.

Figure 4:
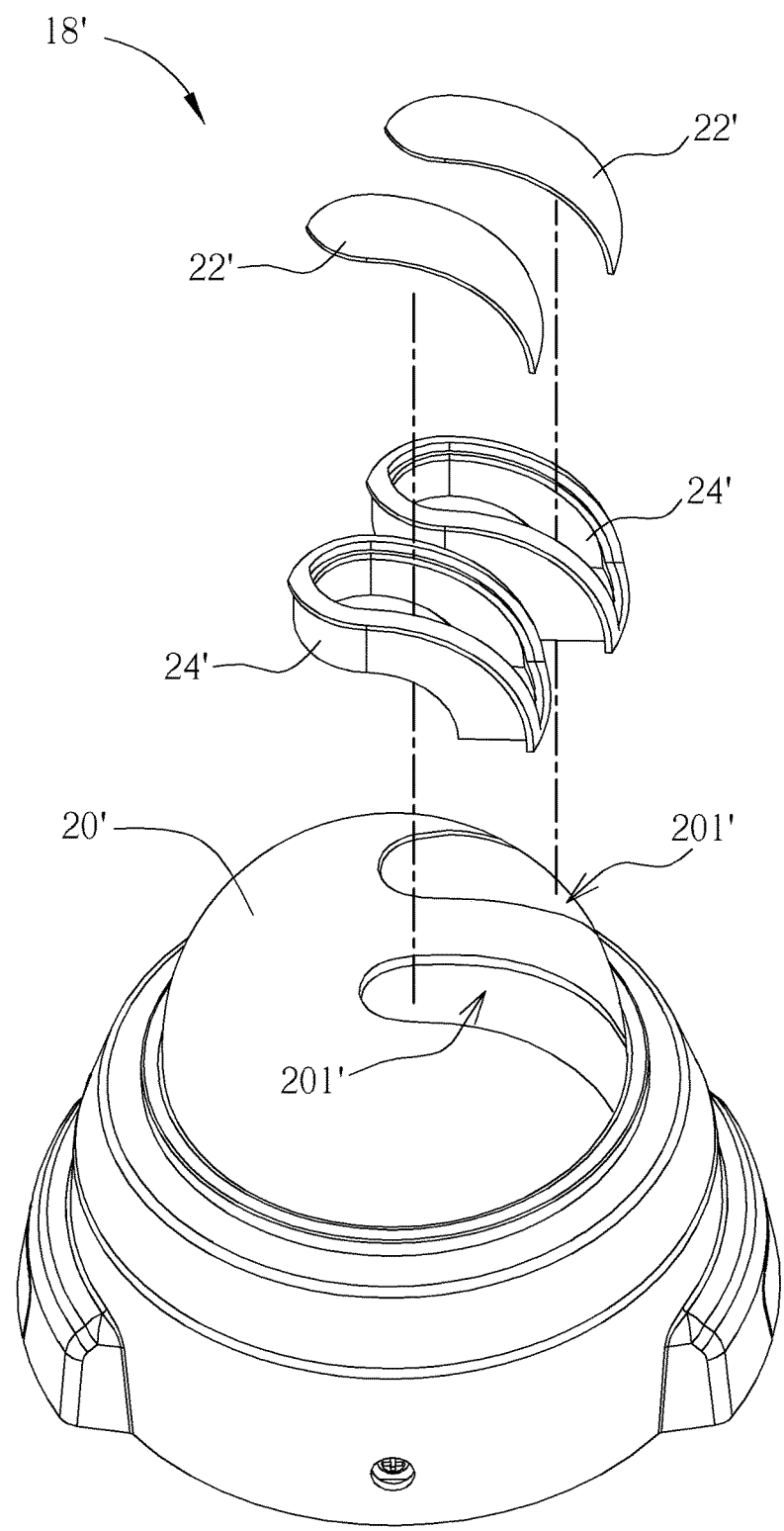
FIG. 4 is a diagram of the optical lampshade according to another embodiment of the present invention.

Please refer to FIG. 4. FIG. 4 is a diagram of the optical lampshade 18' according to another embodiment of the present invention. In the embodiment, elements having the same numerals as ones of the above-mentioned embodiment have the same structures and functions, and a detailed description is omitted herein for simplicity. The first transparent component 20' has two openings 201'. Each of the second transparent components 22' is embedded in the corresponding opaque components 24' and then assembled inside the opening 201'. The opaque components 24' surrounds the light source 16 and is extended inward into the accommodating space 202 (referring to FIG. 2) to isolate the image detector 14 and the light source 16. The beam emitted by the light source 16 passes through the second transparent components 22' to project onto the object, and does not transmit to the first transparent component 20' by obstruction of the opaque components 24'. The image detector 14 captures the beam reflected from the foresaid object and passing through the first transparent component 20' to generate the image about the object.

Figure 5:
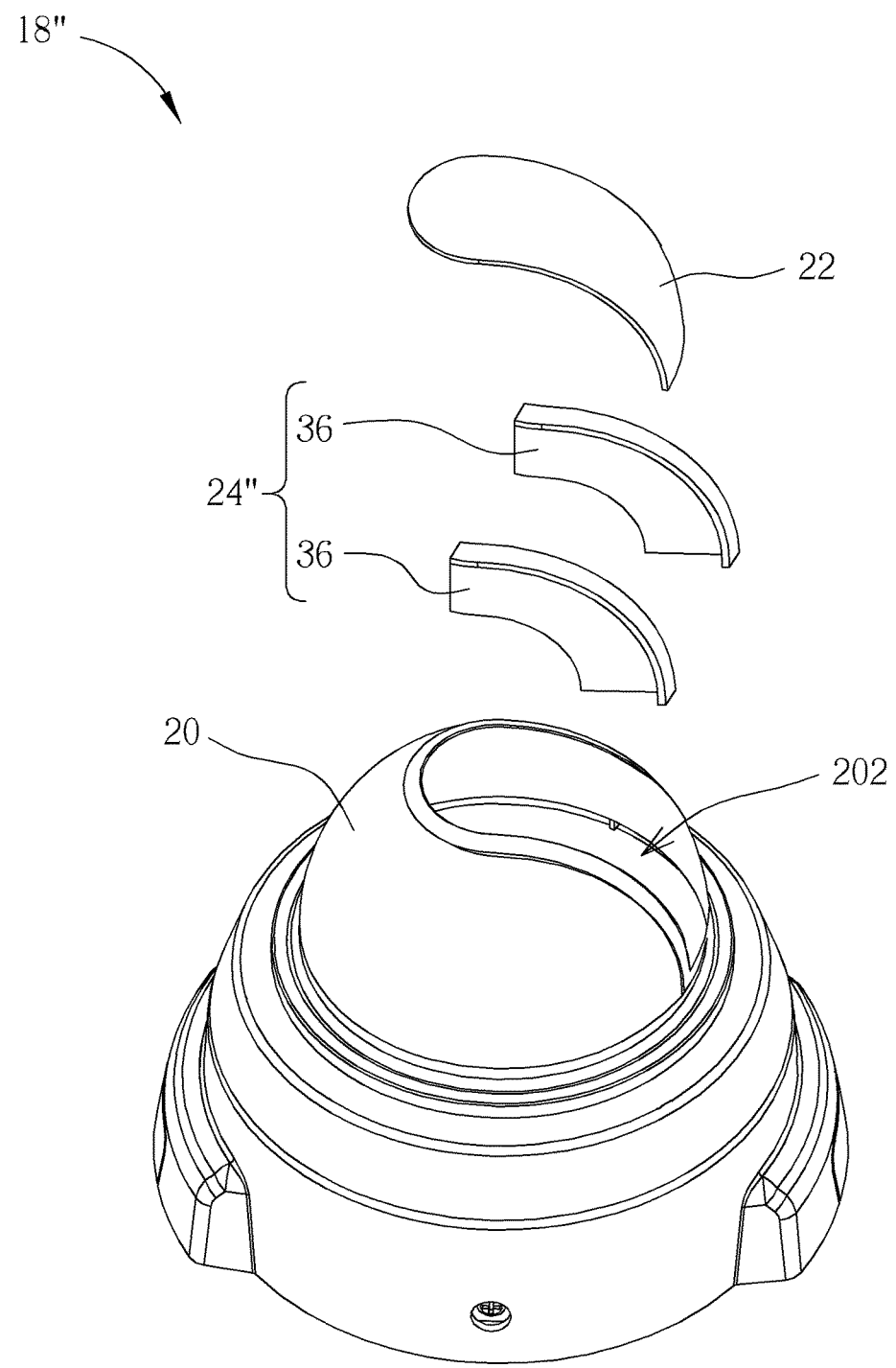
FIG. 5 is a diagram of the optical lampshade according to another embodiment of the present invention.

Please refer to FIG. 5. FIG. 5 is a diagram of the optical lampshade 18" according to another embodiment of the present invention. In the embodiment, elements having the same numerals as ones of the above-mentioned embodiments have the same structures and functions, and a detailed description is omitted herein for simplicity. The opaque components 24" can be mainly composed of several isolating baffles 36. An amount of the isolating baffle 36 corresponds to an amount of the lights source 16. An edge (such as the upper edge 241 shown in FIG. 3) of the isolating baffle 36 aligns with or protrudes from the first exterior surface 28 and the second exterior surface 32, the other opposite edge (such as the lower edge 242 shown in FIG. 3) of the isolating baffle 36 is extended inward into the accommodating space 202 to isolate the image detector 14 and the light source 16. The isolating baffle 36 is blocked between the first transparent component 20 and the second transparent components 22 to prevent direct projection and the internal reflection.

In the present invention, the opaque component includes at least two transparent components and at least one opaque component. The first transparent component and the second transparent component are respectively applied to the image detector and the light source for beam transmission, the opaque component is blocked between the sectional surfaces of the transparent components to isolate noise of the internal reflection. Two edges of the opaque component at least align with the exterior surface and the interior surface respectively, or preferably protrude from the exterior surface and the interior surface for high potency isolation. According to different embodiments, the opaque component may be the enclosed structure, which surrounds the image detector to prohibit the beam projected from the light source to the image detector or surrounds the light source to constrain light-emitting angle of the light source. The opaque component further may be mainly composed of the isolating baffles. Each isolating baffle is extended inward into the accommodating space to isolate the image detector and the light source. Comparing to the prior art, the opaque component is utilized to avoid the internal reflection between the transparent components respectively applied to the image detector and the light source, so the camera device with the opaque component can photograph the high-quality images without considering clean of the transparent component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical lampshade capable of decreasing noise of optical reflection, the optical lampshade comprising:
   a first transparent component whereon an opening is formed, an accommodating space being located inside the first transparent component, the first transparent component comprising a first interior surface and a first exterior surface;
   a second transparent component assembled with the first transparent component via the opening; and
   an opaque component disposed between the first transparent component and the second transparent component, the opaque component stretching from the first exterior surface to the first interior surface and being suspended inside the accommodating space of the first transparent component.

2. The optical lampshade of claim 1, wherein the second transparent component is an individual unit and detachably disposed inside the opening on the first transparent component.

3. The optical lampshade of claim 1, wherein the second transparent component comprises a second interior surface and a second exterior surface, the opaque component stretches from the second exterior surface to the second interior surface since the opaque component is disposed between the first transparent component and the second transparent component.

4. The optical lampshade of claim 1, wherein a height of the opaque component is greater than a thickness of the first transparent component or a thickness of the second transparent component.

5. The optical lampshade of claim 1, wherein two edges of the opaque component respectively align with or protrude from the first interior surface and the first exterior surface.

6. The optical lampshade of claim 1, wherein the opaque component is an enclosed structure disposed around the second transparent component and engaged inside the opening on the first transparent component.

7. A camera device capable of decreasing noise of optical reflection, the camera device comprising:
   a base;
   an image detector disposed on the base;
   a light source disposed around the image detector; and
   an optical lampshade disposed on the base to cover the image detector and the light source, the optical lampshade comprising:
      a first transparent component whereon an opening is formed, an accommodating space being located inside the first transparent component, the first transparent component comprising a first interior surface and a first exterior surface;
      a second transparent component assembled with the first transparent component via the opening; and
      an opaque component disposed between the first transparent component and the second transparent component, the opaque component stretching from the first exterior surface to the first interior surface and being suspended inside the accommodating space of the first transparent component to isolate the image detector and the light source.

8. The camera device of claim 7, wherein the second transparent component is an individual unit and detachably disposed inside the opening on the first transparent component.

9. The camera device of claim 7, wherein the second transparent component comprises a second interior surface and a second exterior surface, the opaque component stretches from the second exterior surface to the second interior surface since the opaque component is disposed between the first transparent component and the second transparent component.

10. The camera device of claim 7, wherein a height of the opaque component is greater than a thickness of the first transparent component or a thickness of the second transparent component.

11. The camera device of claim 7, wherein two edges of the opaque component respectively align with or protrude from the first interior surface and the first exterior surface.

12. The camera device of claim 7, wherein the opaque component is an enclosed structure disposed around the second transparent component and engaged inside the opening on the first transparent component.

13. The camera device of claim 7, wherein a beam emitted by the light source passes through the first transparent component, and the image detector captures an image via the second transparent component.

14. The camera device of claim 7, wherein the opaque component surrounds the image detector and is extended inward into the accommodating space to isolate the image detector and the light source.

15. The camera device of claim 7, wherein the opaque component surrounds the light source and is extended inward into the accommodating space to isolate the image detector and the light source.

\* \* \* \* \*